(12) United States Patent
Darnell et al.

(10) Patent No.: US 7,940,762 B2
(45) Date of Patent: May 10, 2011

(54) CONTENT DRIVEN PACKET SWITCH

(75) Inventors: Brian Scott Darnell, Suwanee, GA (US); Justin Preyer, Atlanta, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 82 days.

(21) Appl. No.: 12/051,720

(22) Filed: Mar. 19, 2008

(65) Prior Publication Data

US 2009/0238184 A1 Sep. 24, 2009

(51) Int. Cl.
*H04L 12/28* (2006.01)
*H04L 12/56* (2006.01)
*G01R 31/28* (2006.01)

(52) U.S. Cl. ........................ 370/389; 714/733
(58) Field of Classification Search .................. None
See application file for complete search history.

(56) References Cited

U.S. PATENT DOCUMENTS

| | | | |
|---|---|---|---|
| 5,561,669 A | 10/1996 | Lenney et al. | |
| 6,094,729 A * | 7/2000 | Mann | 714/25 |
| 6,219,706 B1 * | 4/2001 | Fan et al. | 709/225 |
| 6,430,183 B1 * | 8/2002 | Satran et al. | 370/389 |
| 6,535,511 B1 * | 3/2003 | Rao | 370/392 |
| 7,020,153 B2 * | 3/2006 | Droz et al. | 370/428 |
| 7,107,612 B1 * | 9/2006 | Xie et al. | 726/13 |
| 7,130,301 B2 | 10/2006 | Benayoun et al. | |
| 7,130,302 B2 | 10/2006 | Benayoun et al. | |
| 7,142,515 B2 | 11/2006 | Benayoun et al. | |
| 7,246,173 B2 | 7/2007 | Le et al. | |
| 7,266,110 B1 | 9/2007 | Cao et al. | |
| 7,443,849 B2 * | 10/2008 | Biswas et al. | 370/389 |
| 7,453,874 B1 * | 11/2008 | Nguyen | 370/389 |
| 7,467,358 B2 | 12/2008 | Kang et al. | |
| 2001/0055274 A1 * | 12/2001 | Hegge et al. | 370/229 |
| 2003/0028634 A1 * | 2/2003 | Oshizawa | 709/224 |
| 2003/0212937 A1 * | 11/2003 | Todd et al. | 714/724 |
| 2004/0083305 A1 * | 4/2004 | Wang et al. | 709/240 |
| 2005/0013293 A1 * | 1/2005 | Sahita | 370/389 |
| 2005/0053073 A1 * | 3/2005 | Kloth et al. | 370/395.41 |
| 2005/0111446 A1 * | 5/2005 | Greaves et al. | 370/389 |
| 2006/0039370 A1 * | 2/2006 | Rosen et al. | 370/389 |
| 2006/0104268 A1 * | 5/2006 | Lee et al. | 370/389 |
| 2006/0120373 A1 * | 6/2006 | O'Keeffe et al. | 370/392 |
| 2006/0146813 A1 * | 7/2006 | Biswas et al. | 370/389 |
| 2006/0264178 A1 * | 11/2006 | Noble et al. | 455/67.11 |
| 2007/0086454 A1 | 4/2007 | Grinfeld | |
| 2008/0043760 A1 * | 2/2008 | Venkatraman et al. | 370/401 |
| 2008/0196099 A1 * | 8/2008 | Shastri | 726/12 |
| 2008/0256339 A1 * | 10/2008 | Xu et al. | 712/216 |
| 2009/0249127 A1 * | 10/2009 | Deleris | 714/45 |

OTHER PUBLICATIONS

WO92/10898, Anido et al., Jun. 25, 1992, CA No. 2198110.
International Search Report, PCT/US2009/032025, Jul. 9, 2009.

* cited by examiner

*Primary Examiner* — Pankaj Kumar
*Assistant Examiner* — Hicham B Foud
(74) *Attorney, Agent, or Firm* — Kenneth Glass; Stanley J. Pawlik; Glass & Associates

(57) ABSTRACT

A packet switch routes data packets based on both packet headers and data payloads in the data packets. The packet switch receives data packets, identifies a destination port of the packet switch for each data packet based on a packet header of the data packet, and routes the data packet to the destination port. Additionally, the packet switch selects data packets among the data packets received by the packet switch based on the data payloads of the received data packets, identifies a trace port of the packet switch for each selected data packet, and routes the selected data packet to the trace port.

15 Claims, 5 Drawing Sheets

CONTENT DRIVEN PACKET SWITCH

BACKGROUND

A packet based communication system typically includes a packet switch for routing data packets from source devices to destination devices in the communication system. Generally, the packet switch receives a data packet, identifies a destination address in a packet header of the data packet, and routes the data packet to a destination device identified by the destination address. The destination device then processes the data packet.

In some types of communication systems, a packet header of a data packet includes additional information for routing the data packet. A packet switch in the communication system routes the data packet based on both the destination address and the additional information in the packet header of the data packet. For example, the packet header may include a tag indicating a quality of service for the data packet and the packet switch may route the data packet to a destination device based on both the destination address and the tag. Moreover, the packet switch routes data packets having packet headers containing the same destination address and the same tag to the same destination device. In turn, the destination device processes the data packets. Although these types of communication systems have been successfully employed to route data packets based on additional information in packet headers of the data packets, the additional information in the packet headers of the data packets is often limited by the size and format of the packet headers.

In light of the above, a need exists for an improved system and method of routing data packets through a packet switch.

SUMMARY

In various embodiments, a packet switch routes data packets based on both packet headers and data payloads in the data packets. In this way, the packet switch routes the data packets based in part on the content of the data payloads in the data packets. In some embodiments, the packet switch receives data packets, selects some of the data packets based on the data payloads of the data packets, and routes each of the selected data packets to both a destination port and a trace port of the packet switch. In further embodiments, a trace buffer in the trace port stores the selected data packets and may output the data packets to a device external of the packet switch, for example to debug the packet switch or analyze packet communications through the packet switch. In some embodiments, the packet switch conforms to a serial RapidIO™ standard.

A packet switch, in accordance with one embodiment, includes a first port and a second port coupled to the first port. The first port includes a packet engine configured to receive a data packet including a packet header and a data payload, identify the second port based on the data payload of the data packet, and send the data packet to the second port. In a further embodiment, the packet engine is further configured to identify a third port of the packet switch based on the packet header of the data packet and send the data packet to the third port. In some embodiments, the packet engine is configured to identify the second port based on both the packet header and the data payload of the data packet.

A system, in accordance with one embodiment, includes a packet switch, a first device, and a second device. The packet switch includes a first port including a packet engine and a second port coupled to the first port. The first device is coupled to the first port and is configured to send a data packet including a packet header and a data payload to the first port. The packet engine is configured to identify the second port of the packet switch based on the data payload of the data packet and send the data packet to the second port. The second port is configured to output the first data packet to the second device. In a further embodiment, the packet engine is further configured to identify a third port of the packet switch based on the packet header of the data packet and send the data packet to the third port. In some embodiments, the packet engine is configured to identify the second port based on both the packet header and the data payload of the data packet.

A method, in accordance with one embodiment, includes receiving a data packet including a packet header and a data payload at a first port of a packet switch and identifying a second port of the packet switch based on the data payload of the data packet. The method further includes sending the data packet to the second port of the packet switch. In a further embodiment, the method includes identifying a third port of the packet switch based on the packet header of the data packet and sending the data packet to the third port of the packet switch. In some embodiments, identifying the second port of the packet switch based on the data payload of the data packet includes identifying the second port of the packet switch based on both the packet header and the data payload of the data packet.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, a packet switch routes data packets to destination ports of the packet switch based on packet headers of the data packets. Further, the packet switch selects some of the data packets based on data payloads of the data packets, and routes the selected data packets to one or more trace ports in the packet switch. In this way, the packet switch routes each selected data packet to both a destination port and at least one trace port. In further embodiments, the packet switch includes one or more trace buffers in the trace ports for storing data packets received by the trace ports.

Figure 1:
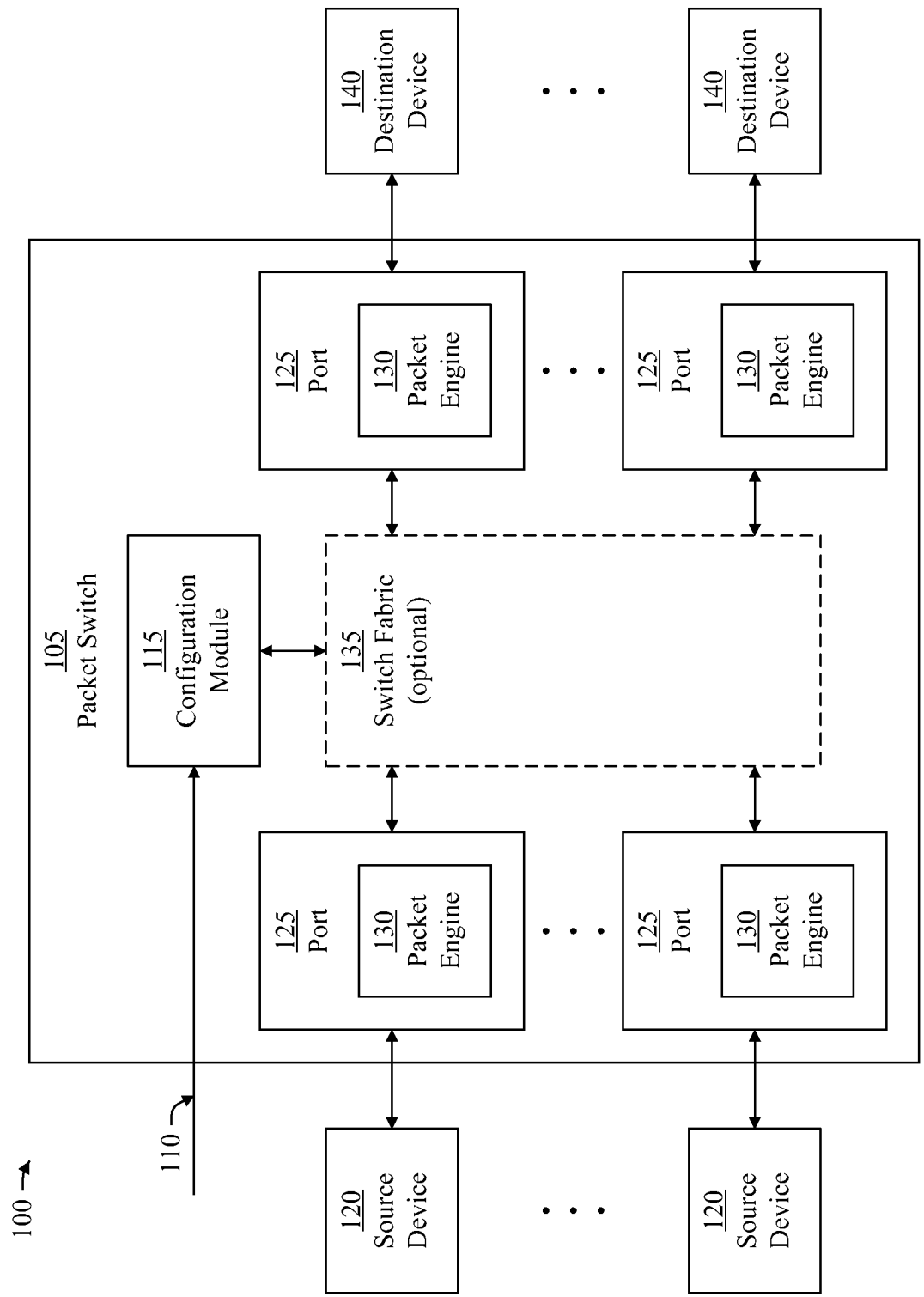
FIG. 1 is a block diagram of a communication system, in accordance with an embodiment of the present invention.

FIG. 1 illustrates a communication system 100, in accordance with an embodiment of the present invention. The communication system 100 includes a packet switch 105, source devices 120, and destination devices 140. Each of the source devices 120 is coupled (e.g., connected) to the packet switch 105 and sends data packets to the packet switch 105. In various embodiments, one or more of the source devices 120 may also receive data packets from the packet switch 105. For example, one or more of the source devices 120 may be input-output devices. Each of the destination devices 140 is coupled (e.g., connected) to the packet switch 105 and receives data packets from the packet switch 105. In various embodiments, one or more of the destination devices 140 may also send data packets to the packet switch 105. For example, one or more of the destination devices 140 may be input-output devices.

The packet switch 105 includes a configuration module 115, ports 125, and an optional switch fabric 135. Each of the ports 125 includes a packet engine 130 and is coupled (e.g., connected) to a corresponding source device 120 or a corresponding destination device 140. In various embodiments, each of the ports 125 may be input ports, output ports, input-output ports, or any combination thereof. The ports 125 and the configuration module 115 are selectively coupled (e.g., connected) to each other to facilitate communication among the ports 125 and the configuration module 115. In embodiments including the switch fabric 135, each of the ports 125 and the configuration module 115 are coupled (e.g., connected) to the switch fabric 135 and communicate by sending data packets to the switch fabric 135, receiving data packets from the switch fabric 135, or both.

In various embodiments, the packet switch 105 may include any number of ports 125. In further embodiments, the ports 125 are coupled (e.g., connected) to each other, for example through the switch fabric 135. In some embodiments, one or more of the source devices 120 may function as a destination device 140 and one or more of the destination devices 140 may function as a source device 120. For example, a source device 120 or a destination device 140 may be an input-output device coupled to a port 125 that is an input-output port. In some embodiments, the packet engine 130 associated with a port 125 may be located externally of the port 125 and coupled (e.g., connected) to the port 125.

The configuration module 115 receives commands (e.g., maintenance commands) and configures the ports 125 of the packet switch 105 based on the commands. In various embodiments, one or more of the ports 125 of the packet switch 105 receive commands from one or more of the devices coupled to the packet switch 105 (e.g., the source devices 120 or the destination devices 140) and send the commands to the configuration module 115.

In some embodiments, the configuration module 115 receives commands through an optional communication channel 110 instead of receiving the commands from one or more of the ports 125 of the packet switch 105. In other embodiments, the configuration module 115 may receive commands through the communication channel 110 or ports 125 of the packet switch 105, or both. In some embodiments, the packet switch 105 conforms to a serial RapidIO standard and operates on data packets conforming to the serial RapidIO standard.

Figure 2:
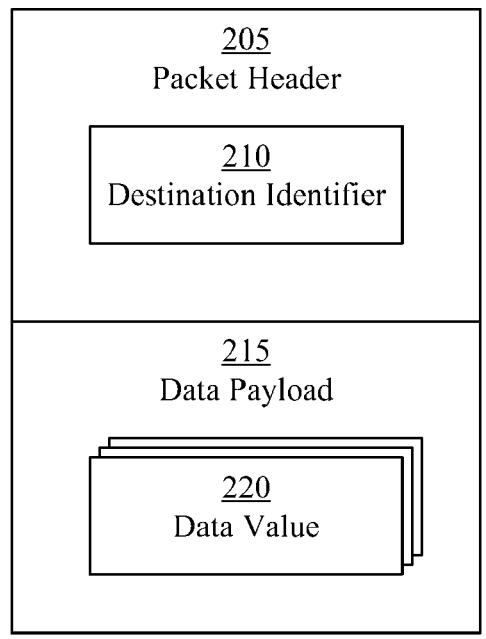
FIG. 2 is a block diagram of a data packet, in accordance with an embodiment of the present invention.

FIG. 2 illustrates a data packet 200, in accordance with an embodiment of the present invention. The data packet 200 includes a packet header 205 and a data payload 215. Moreover, the packet header 205 includes a destination identifier 210 and the data payload 215 includes one or more data values 220. In various embodiments, the packet header 205 may include information in addition to the destination identifier 210. For example, the packet header 205 may include tags or data fields containing additional information.

Each of the data values 220 in the data payload 215 includes one or more data bits of the data payload 215 but need not include the same number of data bits. For example, the data packet 200 may be part of a voice communication and the data value 220 in the data payload 215 of the data packet 200 may be a customer identifier for the voice communication. As a further example, another data value 220 in the data payload 215 of the data packet 200 may indicate a quality of service for the voice communication. Although three data values 220 are illustrated in FIG. 2, the data payload 215 may have more or fewer than three data values 220 in other embodiments.

In operation, the packet switch 105 receives data packets 200 including packet headers 205 and data payloads 215 at ports 125 of the packet switch 105 (e.g., source ports 125) from one or more devices coupled to the ports 125 (e.g., source devices 120). The packet switch 105 selectively routes the data packet 200 to one or more ports 125 of the packet switch 105 (e.g., output ports 125) based on both the packet header 205 and the data payload 215 in the data packet 200.

In one embodiment, a port 125 of the packet switch 105 (e.g., a source port 125) receives a data packet 200 and the packet engine 130 associated with the port 125 identifies another port 125 of the packet switch 105 (e.g., a destination port 125) based on a data value 220 in a data payload 215 of the data packet 200. For example, the packet engine 130 may identify the port 125 of the packet switch 105 (e.g., the destination port 125) based on both the destination identifier 210 in the packet header 205 of the data packet 200 and a data value 220 in the data payload 215 of the data packet 200. Additionally, the packet engine 130 routes the data packet 200 to the identified port 125 (e.g., the destination port 125). In a further embodiment, the packet engine 130 associated with the identified port 125 sends the data packet 200 to the device (e.g., a destination device 140) coupled to the identified port 125.

In another embodiment, a port 125 of the packet switch 105 (e.g., a source port 125) receives a data packet 200 and the packet engine 130 associated with the port 125 identifies a port 125 of the packet switch 105 (e.g., a destination port 125) based on a destination identifier 210 of the data packet 200 and sends the data packet 200 to the identified port 125. In turn the identified port 125 sends the data packet 200 to the device (e.g., a destination device 140) coupled to the identified port 125. Additionally, the packet engine 130 identifies a port 125 of the packet switch 105 (e.g., a trace port 125) based on a data value 220 in a data payload 215 of the data packet 200. For example, the packet engine 130 may identify the port 125 of the packet switch 105 (e.g., the trace port 125) based on both the destination identifier 210 in the packet header 205 of the data packet 200 and a data value 220 in the data payload 215 of the data packet 200. Additionally, the packet engine 130 sends the data packet 200 to the identified port 125 (e.g., the trace port 125). In this way, the packet engine 130 sends the data packet 200 to one port 125 (e.g., the destination port 125) based on the destination identifier 210 of the data packet 200 and to another port 125 (e.g., the trace port 125) based on the data value 220 in the data payload 215 of the data packet 200.

In a further embodiment, the port 125 identified based on the data value 220 in the data packet 200 (e.g., the trace port 125) sends the data packet 200 to a device coupled to that port 125 and located externally of the packet switch 105 (e.g., a destination device 140) and the device processes the data packet 200. For example, the device coupled to the port 125 may analyze the data packet 200 along with other data packets 200 received by the device from the port 125 to debug the packet switch 105.

In various embodiments, the packet switch 105 is programmable to select a data packet 200 received by the packet switch 105 based on the data payload 215 of the data packet 200. In this way, the packet switch 105 selects the data packet 200 based on the content of the data payload 215 in the data packet 200 and a source of the data packet 200 (e.g., a source device 120) need not set a tag in the packet header 205 of the data packet 200 indicating the content of the data payload 215. For example, the packet switch 105 may be programmed to select a data packet 200 that is part of a voice communication based on data, such as a customer identifier, in the data payload 215 of the data packet 200. In some embodiments, the packet switch 105 may be programmed in real time during operation of the packet switch 105.

Figure 3:
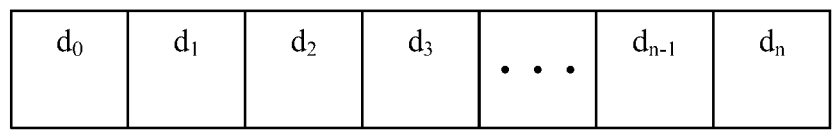
FIG. 3 is a block diagram of a data packet, in accordance with an embodiment of the present invention.

FIG. 3 illustrates the data packet 200, in accordance with an embodiment of the present invention. The data packet 200 includes a number of sequential data bits $d_0$-$d_n$ representing data in the packet header 205 and the data payload 215 of the data packet 200. For example, the number of sequential data bits $d_0$-$d_n$ may be a series of data bits in which a first number of bits in the series represents the packet header 205 of the data packet 200 and a second number of bits following the first number of bits in the series represents the data payload 215 of the data packet 200. Moreover, the data bits representing the data payload 215 of the data packet 200 also represent one or more data values 220 in the data payload 215. In various embodiments, the sequence of data bits $d_0$-$d_n$ represents a sequence of data units, such as data bytes or data words, in the data packet 200. For example, the sequence of data bits $d_0$-$d_n$ may be formed by concatenating a sequence of data words in the data packet 200 according to the order of the data words in the data packet 200.

Figure 4:
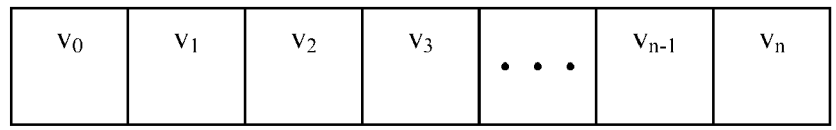
FIG. 4 is a block diagram of a data pattern, in accordance with an embodiment of the present invention.

FIG. 4 illustrates a data pattern 400, in accordance with an embodiment of the present invention. The data pattern 400 includes a number of sequential data bits $v_0$-$v_n$ representing data in the data pattern 400. In operation, a packet engine 130 associated with a port 125 in the packet switch 105 selects data packets 200 received at the port 125 based on the data pattern 400 and routes the data packets 200 to both a destination port 125 based on the packet header 205 of the data packet 200 and a trace port 125 based on the data payload 215 in the data packet 200. In this way, the packet switch 105 sends the data packets 200 to both the trace port 125 and the destination port 125 based on both the packet header 205 and the data payload 215 of the data packet 200.

In one embodiment, the packet engine 130 selects a data packet 200 by comparing the data bits $d_0$-$d_n$ in the data packet 200 with the data bits $v_0$-$v_n$ in the data pattern 400. If the data bits $d_0$-$d_n$ in the data packet 200 match the data bits $v_0$-$v_n$ in the data pattern 400, the packet engine 130 selects the data packet 200. In this way, the packet engine 130 identifies the data packet 200 for routing to the trace port 125. In another embodiment, the packet engine 130 selects (e.g., identifies) a data packet 200 by comparing a portion of the data bits $d_0$-$d_n$ in the data packet 200 with a portion of the data bits $v_0$-$v_n$ in the data pattern 400. If the portion of data bits $d_0$-$d_n$ in the data packet 200 match the portion of data bits $v_0$-$v_n$ in the data pattern 400, the packet engine 130 selects the data packet 200 for routing to the trace port 125.

In various embodiments, the data pattern 400 represents both a destination identifier 210 and a data value 220, and the packet engine 130 selects a data packet 200 if the destination identifier 210 and the data value 220 in the data pattern 400 match a destination identifier 210 and a data value 220 in the data packet 200. In other embodiments, the data pattern 400 includes more than one data value 220 and the packet engine 130 selects a data packet 200 if the destination identifier 210 and the data values 220 in the data pattern 400 match the destination identifier 210 and data values 220 in the data packet 200.

In some embodiments, the packet engine 130 includes more than one data pattern 400 and compares a data packet 200 received by the packet engine 130 with each of the data patterns 400. If the data packet 200 matches one of the data patterns 400, the packet engine 130 identifies a port 125 (e.g., a trace port 125) based on the data packet 200 and sends the data packet 200 to the identified port 125. In another embodiment, if the data packet 200 matches one or more of the data patterns 400, the packet engine 130 identifies a port 125 (e.g., a trace port 125) based on the data packet 200 and sends the data packet 200 to the identified port 125. In still another embodiment, the packet engine 130 identifies a port 125 for each data pattern 400 that matches the data packet 200 and sends the data packet 200 to each of the identified ports 125.

In some embodiments, the data pattern 400 represents one or more data values 220 and the packet engine 130 selects a data packet 200 if each of the data values 220 in the data pattern 400 match a corresponding data value 220 in the data packet 200. In this way, the packet engine 130 selects the data packet 200 based on the data payload 215 of the data packet 200. Further, the packet engine 130 identifies a port 125 based on the selected data packet 200 and sends the selected data packet 200 to the identified port 125 (e.g., a destination port 125 or a trace port 125).

In some embodiments, a port 125 receives data packet 200 as a bit stream and the packet engine 130 of the port 125 performs a bit-by-bit comparison of the data packet 200 or a portion of the data packet 200 with one or more data patterns 400. In these embodiments, the port 125 need not receive the entire data packet 200 before the packet engine 130 performs a bit-by-bit comparison of the data packet 200 or portions thereof with a data pattern 400. Moreover, the port 125 need not store the data packet 200 before performing the bit-by-bit comparison. For example, the packet engine 130 may perform a bit-by-bit comparison of the data payload 215 of the data packet 200 with one or more data patterns 400 while the port 125 is receiving the data packet 200.

Figure 5:
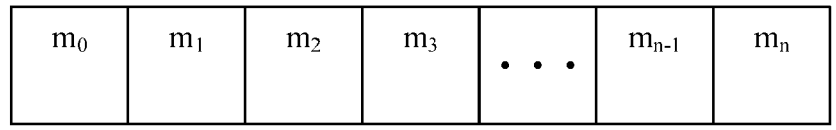
FIG. 5 is a block diagram of a data mask, in accordance with an embodiment of the present invention.

FIG. 5 illustrates a data mask 500, in accordance with an embodiment of the present invention. The data mask 500 includes a number of sequential data bits $m_0$-$m_n$ corresponding to the data bits $d_0$-$d_n$ in the data packet 200. In various embodiments, a packet engine 130 associated with a port 125 in the packet switch 105 performs a masking operation, such as a bitwise logical operation, on the data bits $d_0$-$d_n$ of a data packet 200 and compares the result to a data pattern 400. If the result of the masking operation matches the data pattern 400, the packet engine 130 selects the data packet 200 for routing to a trace port 125.

In one embodiment, a data bit in the data mask 500 (e.g., a data bit $m_0$-$m_n$) has a value of zero to mask out the corresponding data bit in the data packet 200 (e.g., a data bit $d_0$-$d_n$). For example, the packet engine 130 may perform a masking operation by performing a bitwise logical AND operation on the data packet 200 and the data mask 500. In this embodiment, each data bit in the data packet 200 (e.g., a data bit $d_0$-$d_n$) corresponding to a data bit in the data mask 500 (e.g., a data bit $m_0$-$m_n$) having a value of zero is a "don't care" data bit.

Figure 6:
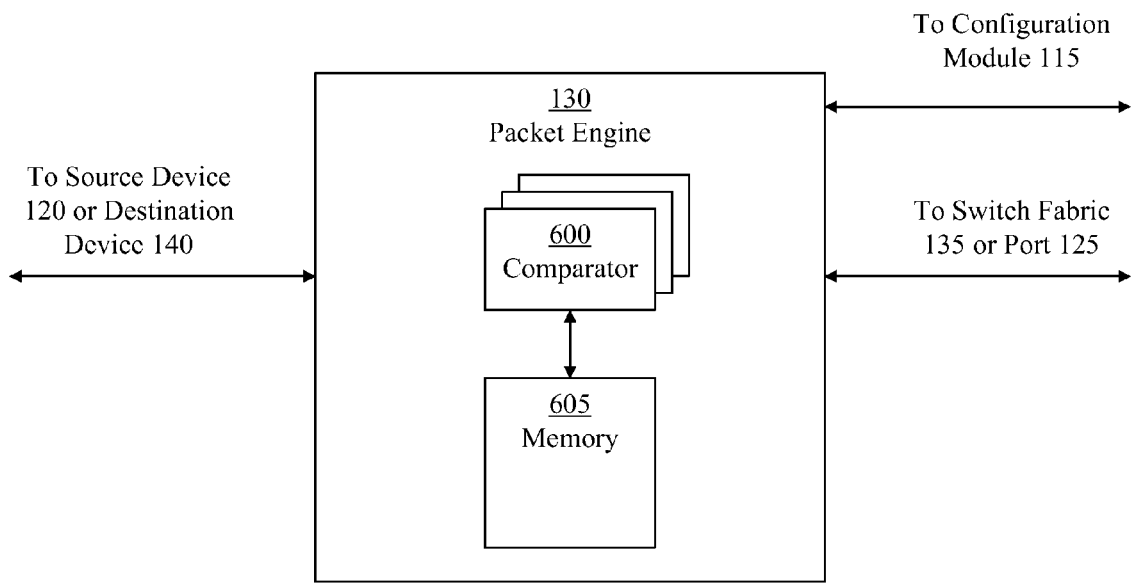
FIG. 6 is a block diagram of a packet engine, in accordance with an embodiment of the present invention.

FIG. 6 illustrates a packet engine 130, in accordance with an embodiment of the present invention. The packet engine 130 includes one or more comparators 600 and a memory 605 coupled to each of the comparators 600. Each of the comparators 600 compares data packets 200 received by the packet engine 130 with a data pattern 400 associated with the comparator 600. In various embodiments, the memory 605 stores the data patterns 400 and a comparator 600 of the packet engine 130 accesses a data pattern 400 associated with the comparator 600 from the memory 605 and compares the data pattern 400 with a data packet 200 received by the packet engine 130. In further embodiments, the memory 605 stores the data masks 500. In these further embodiments, a comparator 600 accesses a data mask 500 associated with the comparator 600 from the memory 605 and uses the data mask 500 to perform a masking operation on a data packet 200 received by the packet engine 130 to generate an intermediate result. Further, the comparator 600 compares the intermediate result with the data pattern 400 associated with the comparator 600 to determine whether the data packet 200 matches the data pattern 400.

In some embodiments, the packet engine 130 receives commands from the configuration module 115, for example through the switch fabric 135, and processes the commands to configure the port 125 associated with the packet engine 130. In various embodiments, the packet engine 130 receives a data packet 200 including both a command and a data pattern 400 from the configuration module 115 and stores the data pattern 400 in the memory 605 based on the command. In some embodiments, the data packet 200 also includes data for associating the data pattern 400 with one of the comparators 600 in the packet engine 130. In these embodiments, the packet engine 130 associates the data pattern 400 with the comparator 600, for example by storing the data pattern 400 in a memory location of the memory 605 associated with the comparator 600.

In various embodiments, the packet engine 130 receives a data packet 200 including both a command and a data mask 500 from the configuration module 115 and stores the data mask 500 in the memory 605 based on the command. In some embodiments, the data packet 200 also includes data for associating the data mask 500 with one of the comparators 600 in the packet engine 130. In these embodiments, the packet engine 130 associates the data mask 500 with the comparator 600, for example by storing the data mask 500 in a memory location of the memory 605 associated with the comparator 600.

In operation, the packet engine 130 receives a data packet 200 from the device coupled to the packet engine 130 (e.g., a source device 120 or a destination device 140), identifies a destination port 125 based on the packet header 205 of the data packet 200, and sends the data packet 200 to the destination port 125. Additionally, the comparator 600 in the packet engine 130 compares the data packet 200 received by the packet engine 130 with the data pattern 400 to determine whether the data packet 200 matches the data pattern 400. If the data packet 200 matches the data pattern 400, the packet engine 130 identifies a trace port 125 based on the data payload 215 in the data packet 200 and sends the data packet 200 to the trace port 125.

In one embodiment, the packet engine 130 sends the data packet 200 to the destination port 125 and the trace port 125 by multicasting the data packet 200 to the destination port 125 and the trace port 125. In another embodiment, the packet engine 130 stores the data packet 200 in the memory 605, sends the data packet 200 to the destination port 125, and sends the data packet 200 to the trace port 125. In still another embodiment, the packet engine 130 duplicates the data packet 200 and sends one of the data packets 200 to the destination port 125 and the other data packet 200 to the trace port 125. In various embodiments, the packet engine 130 may send the data packet 200 to the destination port 125 and the trace port 125 sequentially, in parallel with each other, or substantially simultaneously.

Figure 7:
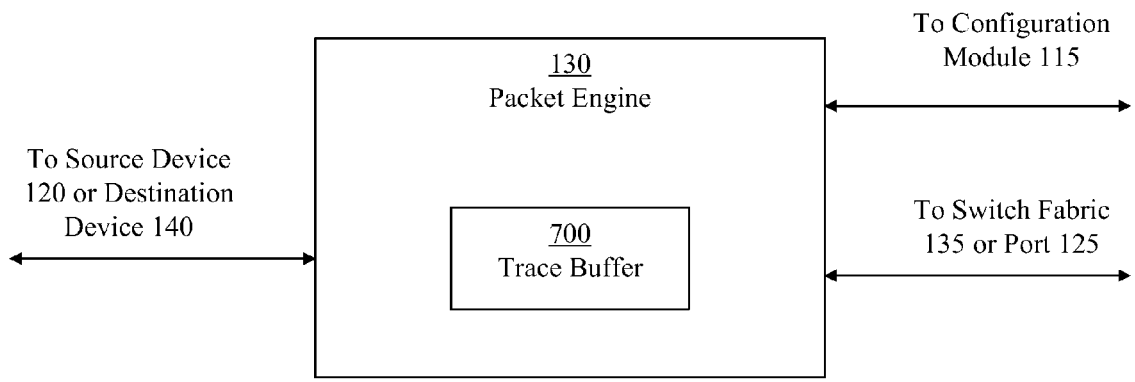
FIG. 7 is a block diagram of a packet engine, in accordance with an embodiment of the present invention.

FIG. 7 illustrates a packet engine 130, in accordance with an embodiment of the present invention. The packet engine 130 is coupled to a trace port 125 of the packet switch 105 and includes a trace buffer 700 for storing data packets 200 received by the packet engine 130. In various embodiments, the trace buffer 700 stores the data packets 200 received by the packet engine 130 based on one or more trace events. In one embodiment, the configuration module 115 generates a start trace event and an input port 125 begins to send data packets 200 received by the input port 125 to the trace port 125 in response to the start trace event. Further, the configuration module 115 generates a stop trace event and the input port 125 stops sending data packets 200 received by the input port 125 to the trace port 125 in response to the stop trace event. For example, the input port 125 may begin comparing data packets 200 received by the input port 125 with one or more data patterns 400 in response to a start trace event and send those data packets 200 that match one or more of the data patterns 400 to the trace port 125. Further, the input port 125 may stop comparing data packets 200 received by the input port 125 with the data patterns 400 and stop sending data packets 200 to the trace port 125 in response to a stop trace event. In some embodiments, the configuration module 115 generates a trace event by writing data into a register based on a command received by the configuration module 115. In various embodiments, the configuration module 115 generates a start trace event upon power up or reset of the packet switch 105.

In one embodiment, the packet engine 130 of the input port 125 generates a data packet 200 including status data in response to a start trace event and sends the generated data packet 200 to the device coupled to the trace port 125 (e.g., a source device 120 or a destination device 140). For example, the generated data packet 200 may include data indicating that the start trace event has occurred. In response to receiving the generated data packet 200, the device may store or process data packets 200 received from the trace port 125, or both. In one embodiment, the generated data packet 200 includes a port write command conforming to a serial RapidIO format.

In one embodiment, the packet engine 130 of the input port 125 generates a data packet 200 including status data in response to a stop trace event and sends the generated data packet 200 to the device coupled to the trace port 125 (e.g., a source device 120 or a destination device 140). For example, the generated data packet 200 may include data indicating that the stop trace event has occurred. In response to receiving the generated data packet 200, the device may process other data packets 200 previously received from the trace port 125. For example, the device may process data packets 200 received from the trace port 125 between a data packet 200 indicating that a start trace event has occurred and another data packet 200 indicating that a stop trace event has occurred. In one embodiment, the generated data packet 200 includes a port write command conforming to a serial RapidIO format.

In other embodiments the trace buffer 700 is optional. In some embodiments without the trace buffer 700, the trace port 125 outputs data packets 200 received by the trace port 125 to a device external of the packet switch 105 (e.g., a destination device 140) coupled to the trace port 125. In some embodiments, a destination device 140 may be coupled to the trace port 125 and decoupled from the trace port 125 during operation of the packet switch 105. In these embodiments, the trace port 125 outputs data packets 200 received by the trace port 125 and the destination device 140 receives data packets 200 output from the trace port 125 when the destination device 140 is coupled to the trace port 125. The destination device 140 may then debug the packet switch 105 or analyze communications through the packet switch 105 based on the data packets 200 received from the trace port 125. For example, the destination device 140 may be a portable trace analyzer used for analyzing communications through the packet switch 105 when the packet switch 105 is deployed in the field.

Figure 8:
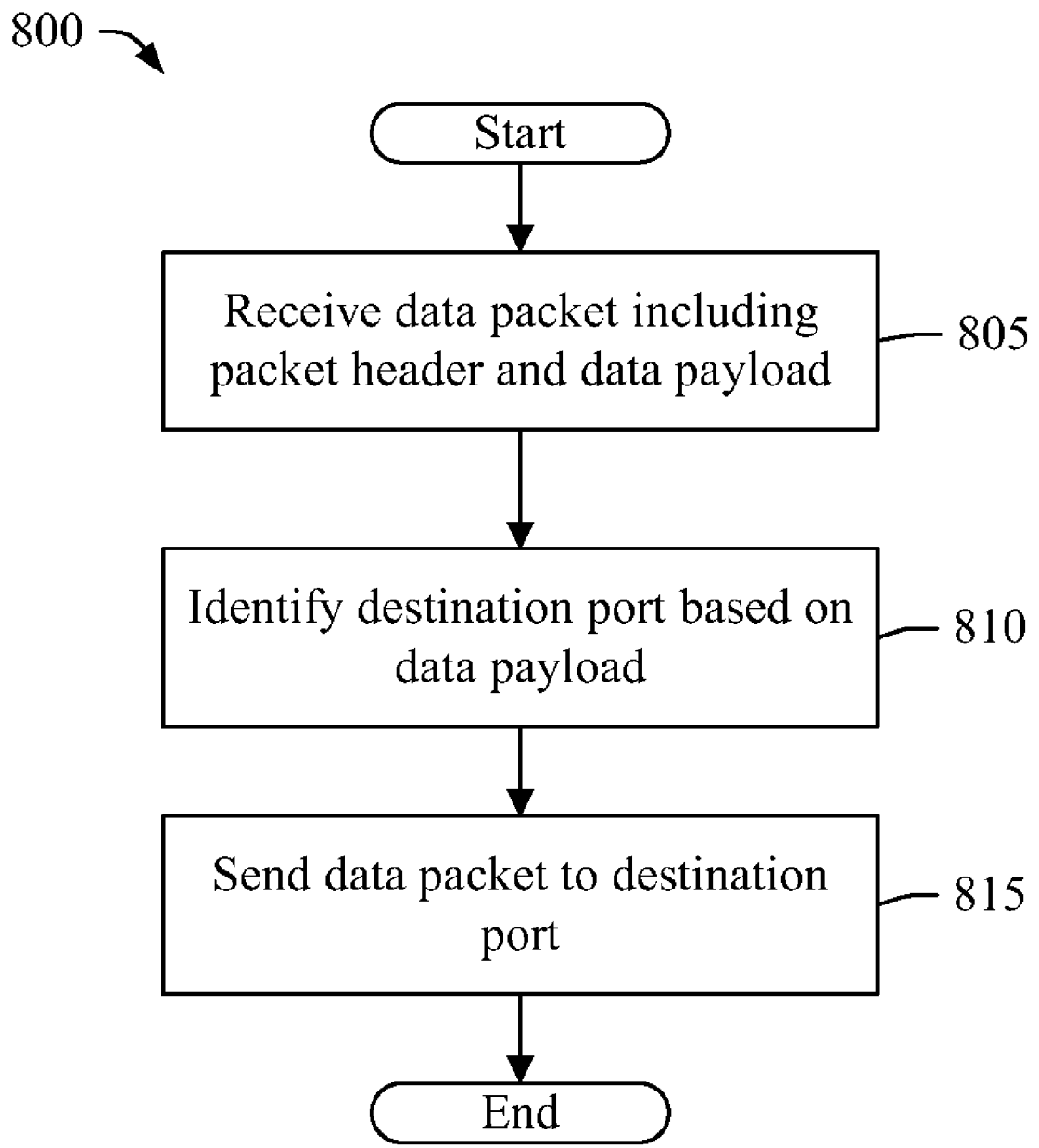
FIG. 8 is a flow chart of a method of routing a data packet through a packet switch, in accordance with an embodiment of the present invention.

FIG. 8 illustrates a method 800 of routing a data packet through a packet switch, in accordance with an embodiment of the present invention. In step 805, a data packet including a packet header and a data payload is received. In one embodiment, a packet engine 130 associated with a port 125 of the packet switch 105 (e.g., a source port 125) receives a data packet 200 from the device coupled to the port 125 (e.g., a source device 120). The method 800 then proceeds to step 810.

In step 810, a destination port is identified based on the data payload in the data packet. In one embodiment, the packet engine 130 identifies a port 125 of the packet switch 105 (e.g., a destination port 125) based on the data payload 215 in the data packet 200. For example, the packet engine 130 may identify a destination port 125 based on the destination identifier 210 in the packet header 205 of the data packet 200 and one or more data values 220 in the data payload 215 of the data packet 200. In another embodiment, the packet engine 130 identifies a port 125 of the packet switch 105 (e.g., a destination port 125) based on both the packet header 205 and the data payload 215 in the data packet 200. For example, the packet engine 130 may identify a destination port 125 based on both a destination identifier 210 of the data packet 200 and one or more data values 220 in the data payload 215 of the data packet 200. The method 800 then proceeds to step 815.

In step 815, the data packet is sent to the destination port. In one embodiment, the packet engine 130 sends the data packet 200 to the port 125 identified by the packet engine 130 (e.g., the destination port 125). The method 800 then ends.

In various embodiments, the method 800 may include more or fewer steps than the steps 805-815 described above and illustrated in FIG. 8. In some embodiments, one or more of the steps 805-815 of the method 800 may be performed in parallel or substantially simultaneously.

Figure 9:
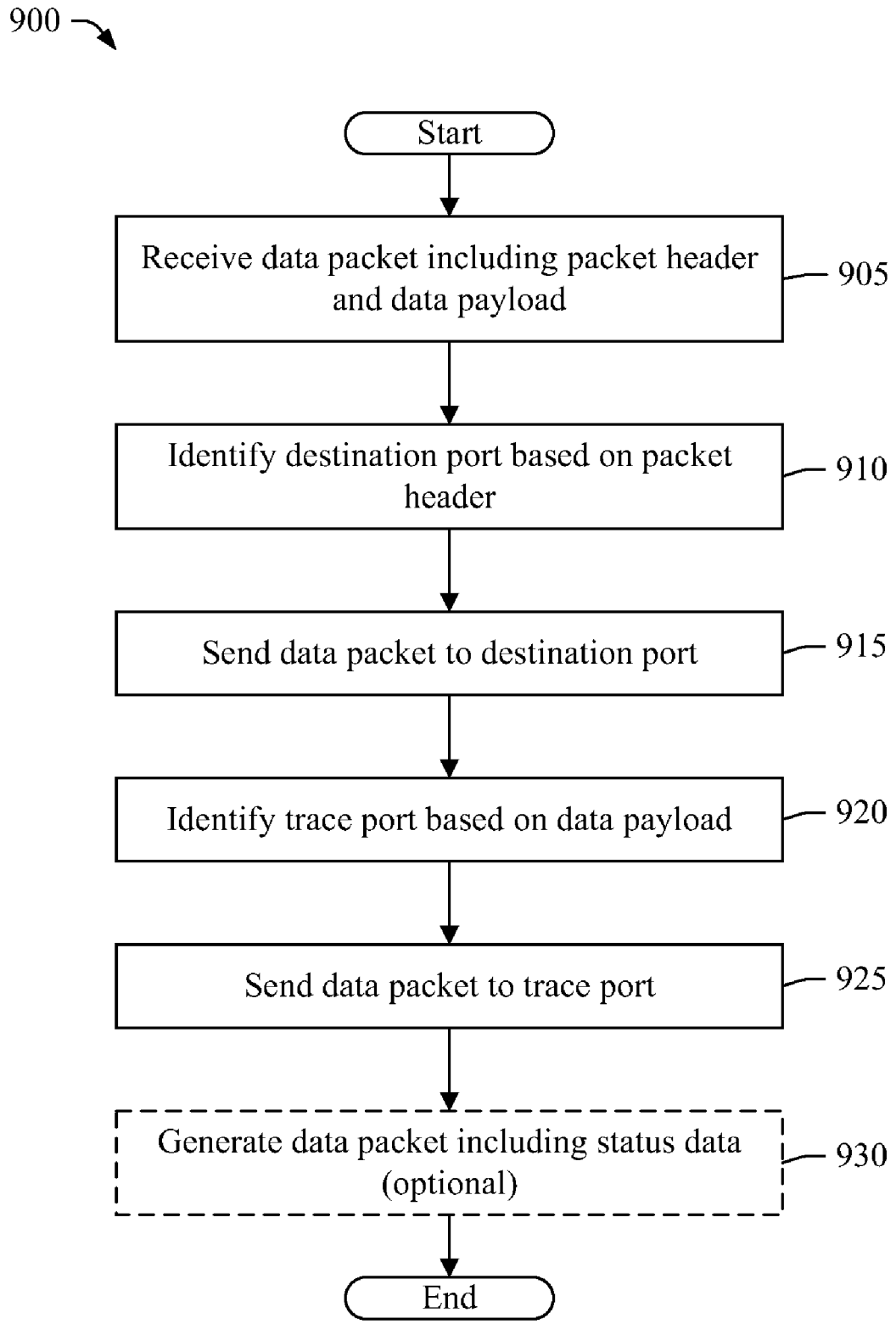
FIG. 9 is a flow chart of a method of routing a data packet through a packet switch, in accordance with an embodiment of the present invention.

FIG. 9 illustrates a method 900 for routing a data packet through a packet switch, in accordance with an embodiment of the present invention. In step 905, a data packet 200 including a packet header 205 and a data payload 215 is received. In one embodiment, a packet engine 130 associated with a port 125 of the packet switch 105 (e.g., a source port 125) receives a data packet 200 from a device coupled to the port 125 (e.g., a source device 120). The method 900 then proceeds to step 910.

In step 910, a destination port is identified based on the packet header in the data packet. In one embodiment, the packet engine 130 identifies a port 125 of the packet switch 105 (e.g., a destination port 125) based on the packet header 205. For example, the packet engine 130 may identify the destination port 125 based on the destination identifier 210 in the packet header 205. The method 900 then proceeds to step 915.

In step 915, the data packet is sent to the destination port. In one embodiment, the packet engine 130 sends the data packet 200 to the port 125 identified by the packet engine 130 (e.g., the destination port 125) based on the packet header 205 of the data packet 200. The method 900 then proceeds to step 920.

In step 920, a trace port is identified based on the data payload in a data packet. In one embodiment, the packet engine 130 identifies a port 125 of the packet switch 105 (e.g., a trace port 125) based on the data payload 215 in the data packet 200. For example, the packet engine 130 may identify a trace port 125 based on the data payload 215 of the data packet 200. In another embodiment, the packet engine 130 identifies a port 125 of the packet switch 105 (e.g., a trace port 125) based on both the packet header 205 and the data payload 215 in the data packet 200. For example, the packet engine 130 may identify a trace port 125 based on the destination identifier 210 in the packet header 205 and one or more data values 220 in the data payload 215 of the data packet 200. The method 900 then proceeds to step 925.

In step 925, the data packet is sent to the trace port. In one embodiment, the packet engine 130 sends the data packet 200 to the port 125 identified by the packet engine 130 (e.g., the trace port 125) based on the data payload 215 of the data packet 200. The method 900 then proceeds to step 930.

In optional step 930, the trace port generates a data packet including status data. In one embodiment, the port 125 that received the data packet 200 identified by the packet engine 130 (e.g., the trace port 125) based on the data payload 215 of the data packet 200 generates a data packet 200 including status data. For example, the packet engine 130 associated with the trace port 125 may generate the data packet 200 including status data indicating that a stop trace event has occurred. In one embodiment, the generated data packet 200 includes a port write command conforming to a serial RapidIO format. The method 900 then ends.

In various embodiments, the method 900 may include more or fewer steps than the steps 905-930 described above and illustrated in FIG. 9. In some embodiments, one or more of the steps 905-930 of the method 900 may be performed in parallel or substantially simultaneously. In various embodiments, the steps 905-930 of the method 900 may be performed in a different order than the order described above and illustrated in FIG. 9.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch, comprising:
   a switch fabric;
   a first port coupled to the switch fabric and comprising a first packet engine configured to receive a first data packet including a packet header and a data payload;
   a second port coupled to the switch fabric, the first packet engine further configured to identify the second port based on the packet header of the first data packet, the switch fabric configured to route the first data packet to the second port, the second port configured to output the first data packet from the packet switch; and
   a third port coupled to the switch fabric, the first packet engine further configured to select the first data packet for routing to a trace port based on the data payload of the first data packet and identify the third port as the trace port based on both the packet header and the data payload of the first data packet, the switch fabric further configured to route the first data packet to the trace port for analysis of packet communication through the packet switch.

2. The packet switch of claim 1, wherein the first packet engine is further configured to select the first data packet based on the data payload of the first data packet by comparing the first data packet with a data pattern.

3. The packet switch of claim 2, wherein the first packet engine is further configured to compare the first data packet with the data pattern by masking the data packet with a data mask to generate a result and comparing the result with the data pattern.

4. The packet switch of claim 1, wherein the trace port comprises a second packet engine configured to generate a second data packet indicating a start trace event occurring in the packet switch and generate a third data packet indicating a stop trace event occurring in the packet switch, and wherein the trace port is configured to output the second data packet and the third data packet from the packet switch.

5. The packet switch of claim 4, wherein each of the second data packet and the third data packet conforms to a serial RapidIO format and comprises a port write command.

6. The packet switch of claim 1, wherein the trace port comprises a second packet engine including a trace buffer configured to store packets received by the trace port.

7. The packet switch of claim 6, wherein the first packet engine comprises comparators each configured to generate a result by comparing the first data packet with a data pattern associated with the comparator, and the first packet engine is further configured to select the first data packet based on the results generated by the comparators.

8. A method comprising:
receiving a first data packet including a packet header and a data payload at a first port of a packet switch;
identifying a second port of the packet switch based on the packet header of the first data packet;
routing the first data packet to the second port of the packet switch;
outputting the first data packet from the packet switch at the second port;
selecting the first data packet for routing to a trace port based on the data payload of the first data packet;
identifying a third port of the packet switch as the trace port based on both the packet header and the data payload of the first data packet; and
routing the first data packet to the trace port of the packet switch for analysis of packet communication through the packet switch.

9. The method of claim 8, wherein selecting the first data packet for routing to the trace port based on the data payload of the first data packet comprises comparing the first data packet with at least one data pattern.

10. The method of claim 9, wherein comparing the first data packet with the at least one data pattern comprises:
masking the data packet with a data mask to generate a result; and
comparing the result with the at least one data pattern.

11. The method of claim 9, wherein receiving the first data packet comprises receiving the first data packet as a bit stream, and wherein comparing the first data packet with the data pattern comprises performing a bit-by-bit comparison of a portion of the first data packet with the data pattern before receiving the entire first data packet.

12. The method of claim 8, further comprising:
generating a second data packet indicating a start trace event occurring in the packet switch;
outputting the second data packet from the packet switch;
generating a third data packet indicating a stop trace event occurring in the packet switch; and
outputting the third data packet from the packet switch.

13. A packet switch, comprising:
a switch fabric;
a first port coupled to the switch fabric and comprising a first packet engine configured to receive a first data packet including a packet header and a data payload;
a second port coupled to the switch fabric, the first packet engine further configured to identify the second port based on the packet header of the first data packet, the switch fabric configured to route the first data packet to the second port, the second port configured to output the first data packet from the packet switch;
a third port coupled to the switch fabric, the first packet engine further configured to select the first data packet for routing to a trace port based on the data payload of the first data packet and identify the third port as the trace port based on the packet header and the data payload of the first data packet, the switch fabric further configured to route the first data packet to the trace port for analysis of packet communication through the packet switch; and
wherein the first packet engine comprises comparators, each comparator configured to generate a result by comparing the first data packet with a data pattern associated with the comparator, and the first packet engine is further configured to select the first data packet for routing to a trace port based on the results generated by the comparators.

14. The packet switch of claim 13, wherein the trace port comprises a second packet engine including a trace buffer configured to store packets received by the trace port.

15. The packet switch of claim 13, wherein the trace port comprises a second packet engine configured to generate a second data packet indicating a start trace event occurring in the packet switch and generate a third data packet indicating a stop trace event occurring in the packet switch, and wherein the trace port is configured to output the second data packet and the third data packet from the packet switch.

* * * * *